United States Patent [19]
MacDonald et al.

[11] Patent Number: 5,768,584
[45] Date of Patent: Jun. 16, 1998

[54] ROM CHIP ENABLE ENCODING METHOD AND COMPUTER SYSTEM EMPLOYING THE SAME

[75] Inventors: James R. MacDonald, Buda; Douglas D. Gephardt, Austin, both of Tex.

[73] Assignee: Advanced Micro Systems, Inc., Sunnyvale, Calif.

[21] Appl. No.: 710,047

[22] Filed: Sep. 10, 1996

Related U.S. Application Data

[63] Continuation of Ser. No. 166,324, Dec. 10, 1993, abandoned.

[51] Int. Cl.$^6$ .................................................. G06F 12/06
[52] U.S. Cl. .................... 395/651; 395/653; 364/245; 711/2; 711/5; 711/170
[58] Field of Search .................... 395/651, 652, 395/653; 711/1, 2, 5, 170; 364/245

[56] References Cited

U.S. PATENT DOCUMENTS

| | | | |
|---|---|---|---|
| 4,118,773 | 10/1978 | Raguin et al. | 364/200 |
| 4,503,491 | 3/1985 | Lushtak et al. | 364/200 |
| 4,713,759 | 12/1987 | Yamagishi et al. | 364/200 |
| 5,005,157 | 4/1991 | Catlin | 365/193 |
| 5,151,876 | 9/1992 | Ikeda | 365/94 |
| 5,245,572 | 9/1993 | Kosonocky et al. | 365/189.02 |
| 5,307,497 | 4/1994 | Feigenbaum et al. | 395/700 |

OTHER PUBLICATIONS

"Flash Memory BIOS for PC and Notebook Computers" by Jerry Jex, IEEE Communications, Computers, and Signal Processing, 1991.

"DOC: Dynamic Eprom Size Detector," *Motorola Technical Deelopments*, 8182, Dec. 1991, Illinois: Motorola, Inc., pp. 109.

*Primary Examiner*—James P. Trammell
*Assistant Examiner*—Michael T. Richey
*Attorney, Agent, or Firm*—Conley, Rose & Tayon; B. Noel Kivlin

[57] ABSTRACT

A non-volatile memory chip enable encoding method allows the storage of both boot code and user application software within a common memory array. The chip enable encoding method further allows a variable number of memory banks to be provided within the non-volatile memory array and allows the system to power-up and execute the boot code before the array configurations are selected by firmware. In one embodiment, a memory controller includes four chip enable output lines for selectively enabling a plurality of ROM banks. One of the ROM banks includes boot code that is executed by the system microprocessor during system boot. If the user requires a ROM array consisting of four ROM banks, a separate chip enable output line is connected to each ROM bank. If the user instead requires a ROM array consisting of, for example, eight ROM banks, an external decoder may be connected to the four chip enable output lines. In this configuration, each output line of the decoder is coupled to a respective bank enable input line of the ROM banks. In either configuration, the chip enable lines are driven in a mutually exclusive relationship during system boot to access the boot code (stored within one of the ROM banks). Subsequently, the encoding of the chip enable signals at the chip enable output lines of the memory controller is dependent upon configuration information stored in a configuration register.

17 Claims, 5 Drawing Sheets

ROM CE Encoding

| CE0 | CE1 | CE2 | CE3 | |
|---|---|---|---|---|
| 0 | 1 | 1 | 1 | Bank3 ← (Boot Bank) |
| 1 | 0 | 1 | 1 | Bank2 |
| 1 | 1 | 0 | 1 | Bank1 |
| 1 | 1 | 1 | 0 | Bank0 |

FIG. 3

ROM CE Encoding

| $\overline{CE0}$ | $\overline{CE1}$ | $\overline{CE2}$ | $\overline{CE3}$ | |
|---|---|---|---|---|
| 0 | 1 | 1 | 1 | Bank7 ← (Boot Bank) |
| 0 | 1 | 1 | 0 | Bank6 |
| 0 | 1 | 0 | 1 | Bank5 |
| 0 | 1 | 0 | 0 | Bank4 |
| 0 | 0 | 1 | 1 | Bank3 |
| 0 | 0 | 1 | 0 | Bank2 |
| 0 | 0 | 0 | 1 | Bank1 |
| 0 | 0 | 0 | 0 | Bank0 |
| 1 | x | x | x | No Bank Selected |

FIG. 5

ROM CHIP ENABLE ENCODING METHOD AND COMPUTER SYSTEM EMPLOYING THE SAME

BACKGROUND OF THE INVENTION

This application is a continuation of application Ser. No. 08/166,324, filed Dec. 10, 1993 now abandoned.

1. Field of the Invention

This invention relates to computer systems and more particularly to chip enable encoding methods employed by memory controllers for selecting individual banks of non-volatile memory.

2. Description of the Relevant Art

Most computer systems include software code in ROM or flash memory that allows the system to read the operating system software from a disk at power-up. This software code is often referred to as the boot-strap code or boot code, and the process of loading the operating system from the disk is called "booting the system". The boot code typically contains only enough software to read the operating system, which is generally stored on a specific track of the disk. The operating system software itself provides the capability of performing more general read and write accesses. A typical computer system includes a dedicated ROM integrated circuit chip referred to as the BIOS (Basic Input/Output System) ROM which contains the boot code and a collection of additional subroutines (referred to as BIOS code) to provide a standard software interface for the system.

Due to the low cost and low power consumption of read only memory, ROM integrated circuits are also becoming a popular storage medium for user software such as word processing programs as well as for the operating system software. This is particularly true for applications within portable computer systems. The read only memory used to store such user software is typically quite large in capacity (compared to that of the BIOS ROM) and is often arranged as one or more ROM banks that may be selectively accessed through a memory controller. The memory capacity of this user ROM is typically variable to suit the needs of a particular user and is specified within the BIOS code.

Since the BIOS ROM subsystem must be accessed at power-up and before system configuration (that is, before the system has been booted), and since the user ROM subsystem has an indeterminate size (at least, as far as the memory controller is concerned) prior to system configuration and can be accessed only after the system configuration routines have completed execution, the two memory subsystems have typically been treated completely separately. As a result, separate integrated circuit chips have been used for the two memory subsystems, therefore causing an increase in the overall cost, weight and size of the computer system.

SUMMARY OF THE INVENTION

The problems outlined above are in large part solved by a non-volatile memory chip enable encoding method and computer system according to the present invention. The chip enable encoding method allows the storage of both boot code and user application software within a common non-volatile memory array. The chip enable encoding method further allows a variable number of memory banks to be provided within the non-volatile memory array and allows the system to power-up and execute the boot code before the memory array configurations are selected by firmware.

In one embodiment, a memory controller includes four chip enable output lines for selectively enabling a plurality of ROM banks. One of the ROM banks includes boot code that is executed by the system microprocessor during system boot. If the user requires a ROM array consisting of four ROM banks, a separate chip enable output line is connected to each ROM bank. If the user instead requires a ROM array consisting of, for example, eight ROM banks, an external decoder may be connected to the four chip enable output lines. In this configuration, each output line of the decoder is coupled to a respective bank enable input line of the ROM banks. In either configuration, the chip enable lines are driven in a mutually exclusive relationship during system boot to access the boot code (stored within one of the ROM banks). The boot code includes configuration information indicative of the number of ROM banks connected within the system. This configuration information is stored within a configuration register of the memory controller. Subsequently, the encoding of the chip enable signals at the chip enable output lines of the memory controller is dependent upon the configuration information. For the configuration in which only four ROM banks are connected to the computer system, the chip enable output lines are driven in a mutually exclusive relationship by the encoder such that a chip enable signal can be asserted at only one of the chip enable output lines at a time. For the configuration in which eight ROM banks are connected to the computer system, the chip enable output lines are driven such that a chip enable signal can be asserted at more than one of the chip enable output lines at a time.

Broadly speaking, the present invention contemplates a memory chip enable encoding method for enabling selected memory banks within a non-volatile memory array. The non-volatile memory array is operatively coupled to a memory controller including a plurality of chip enable output lines. The chip enable encoding method comprises the steps of providing a plurality of memory banks each having a separate bank enable input line, storing boot code within one of the memory banks, and asserting a chip enable signal at only one of the chip enable output lines to thereby retrieve the boot code. The method further comprises the steps of, depending upon the number of memory banks coupled to the memory controller, either driving the plurality of chip enable output lines in a mutually exclusive relationship such that a chip enable signal is asserted at only one chip enable output line at a time to thereby enable a selected memory bank within the non-volatile memory array, or driving the plurality of chip enable output lines such that more that one chip enable signal is asserted at a time to thereby provide encoded information regarding a memory bank within the non-volatile memory array to be enabled.

The invention further contemplates a computer system comprising a memory controller including a plurality of chip enable output lines, and a non-volatile memory array including a plurality of memory banks. One of the memory banks includes boot code that is capable of being transferred to the microprocessor during system boot, and each of the memory banks includes a bank enable input line. The computer system further comprises a decoder having a plurality of input lines coupled to the plurality of chip enable output lines of the memory controller and having a plurality of output lines each coupled to a separate bank enable input line of the memory banks. The memory controller includes a chip enable encoder capable of asserting a chip enable signal at a predetermined one of the plurality of chip enable output lines during system boot to enable one of the memory banks. Following system boot, the chip enable address encoder is capable of simultaneously asserting chip enable signals at more than one chip enable output line at a time to enable another memory bank within the non-volatile memory array.

The invention finally contemplates a memory controller comprising an interface and control circuit for orchestrating the transfer of data and address signals between a microprocessor and a non-volatile memory array, a configuration register coupled to the interface and control circuit for storing a value indicative of the number of memory banks provided within the non-volatile memory array, and a chip enable address encoder coupled to the configuration register wherein the chip enable address encoder includes a plurality of chip enable output lines. The chip enable address encoder is programmable such that, if the configuration register indicates that a first number of memory banks are provided within the non-volatile memory array, the chip enable output lines are driven such that only one chip enable signal is asserted at a given time at the chip enable output lines. If the configuration register indicates that a second number of memory banks are provided within the non-volatile memory array, the chip enable output lines are driven such that more than one chip enable signal is asserted at the chip enable output lines at a given time.

BRIEF DESCRIPTION OF THE DRAWINGS

Other objects and advantages of the invention will become apparent upon reading the following detailed description and upon reference to the accompanying drawings in which:

FIG. 3 is a chart that indicates the ROM chip enable encoding for the computer system of FIG. 1.

FIG. 5 is a chart that indicates the ROM chip enable encoding for the computer system of FIG. 4.

Figure 1:
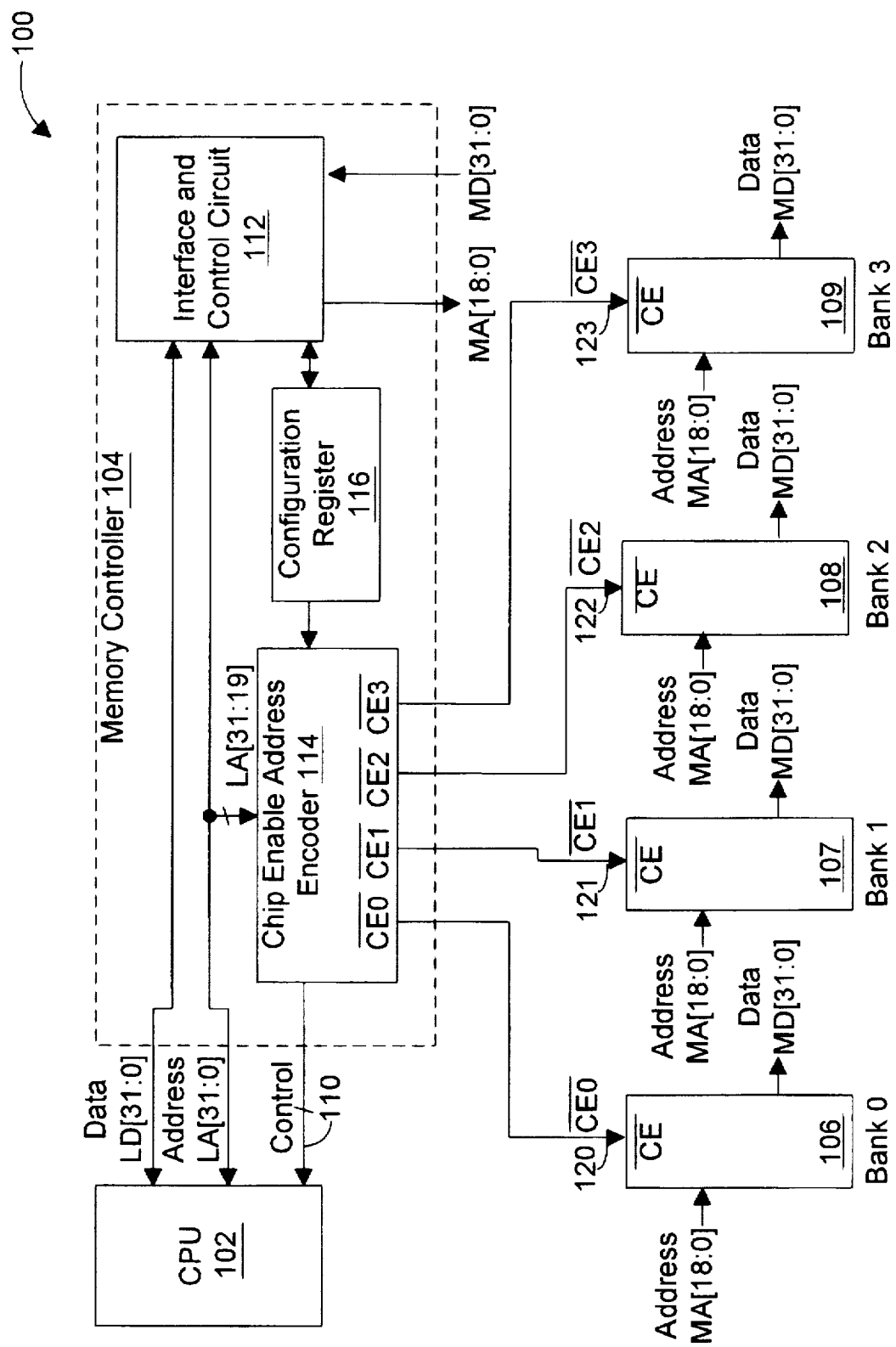
FIG. 1 is a block diagram of a computer system including a memory controller connected to four banks of read only memory according to the present invention.

While the invention is susceptible to various modifications and alternative forms, specific embodiments thereof are shown by way of example in the drawings and will herein be described in detail. It should be understood, however, that the drawings and the detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE INVENTION

Referring now to the drawings, FIG. 1 is a block diagram of a computer system 100 that employs a non-volatile memory chip enable encoding method according to the present invention. The computer system 100 includes a microprocessor (CPU) 102 coupled to a memory controller 104. A ROM array 105 consisting of four ROM banks 106–109 is further shown coupled to memory controller 104.

The microprocessor 102 provides data, address, and control signals to memory controller 104 via a local bus including a 32-bit data bit LD[31:0], and 32-bit address bus LA[31:0] and a control bus 110. Microprocessor 102 is exemplary of, for example, a model 80486 microprocessor.

It is understood, however, that other specific microprocessors could alternatively be employed within computer system 100.

Memory controller 104 includes an interface and control circuit 112 that orchestrates the transfer of data, address, and control signals between microprocessor 102 and ROM array 105. A memory address bus MA[18:0] and a memory data bus MD[31:0] are coupled to ROM banks 106–109 for providing addressing and data signals to and from ROM array 105. Various other control lines such as read and write control lines may further be coupled between interface and control circuit 112 and ROM array 105, but have not been illustrated in FIG. 1 in the interest of clarity. It is noted that the interface and control circuit 112 may be implemented using a variety of specific circuit configurations, and that exemplary circuit configurations may be found in a host of publications of the known prior art. It is further noted that in the preferred embodiment, microprocessor 102 and memory controller 104 are fabricated on a single integrated processor chip.

Memory controller 104 also includes a chip enable address encoder 114 and a configuration register 116. As will be better understood from the following, the chip enable address encoder includes a set of chip enable output lines labeled CE0, CE1, CE2, and CE3 for enabling respective ROM banks of the computer system 100. As will also be better explained in greater detail below, configuration register 116 is provided for storing a bit (or bits) of data which is indicative of the number of ROM banks coupled to memory controller 104.

Each of the ROM banks 106–109 includes a separate ROM bank enable input line 120–123, respectively. In this embodiment, each ROM bank 106–109 is capable of storing 500 kilobytes of 32-bit data. Accordingly, each ROM bank 106–109 includes a set of address input lines MA[18:0] and a set of data output lines MD[31:0].

Figure 2:
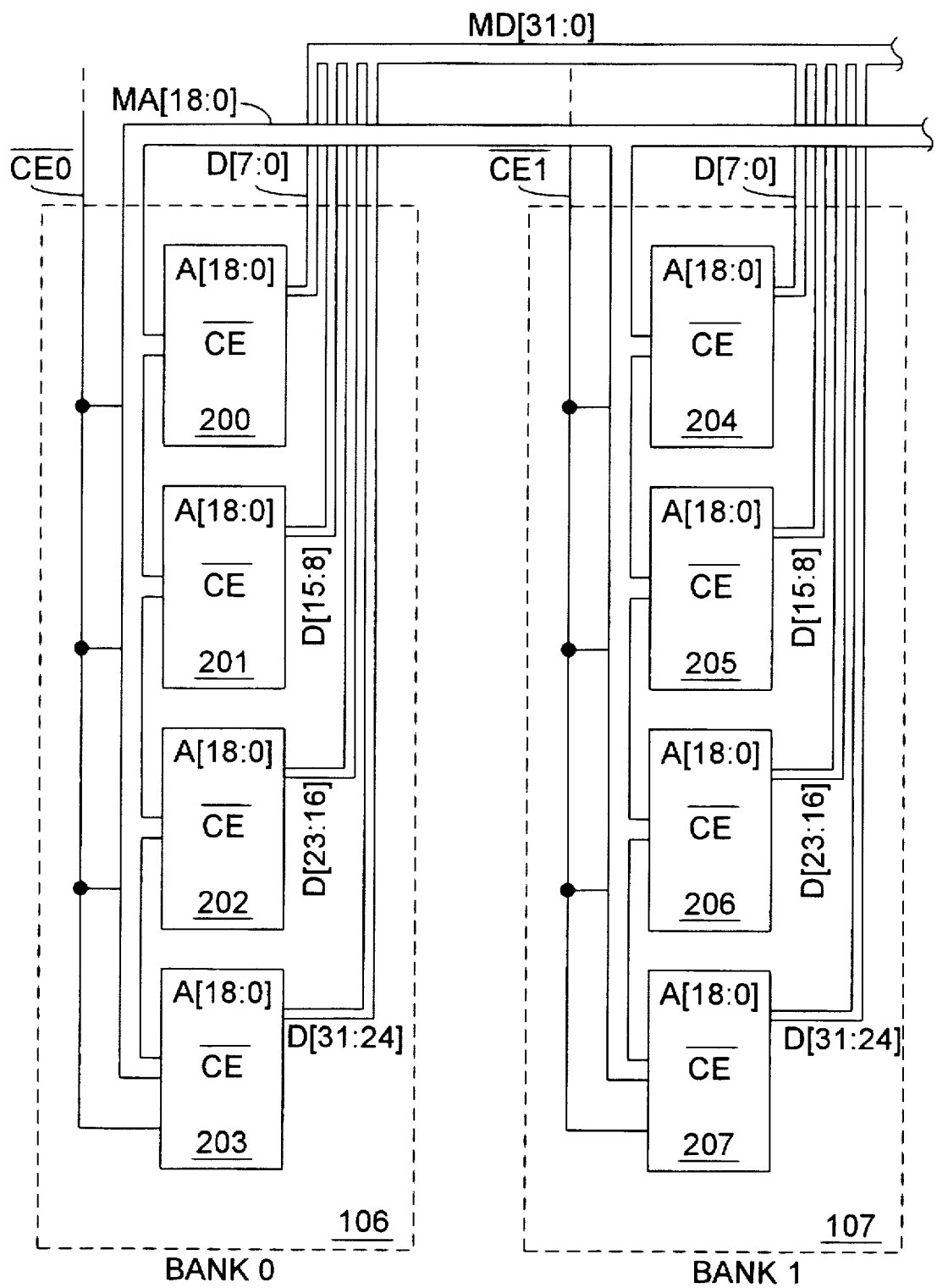
FIG. 2 is a block diagram that illustrates a configuration of ROM integrated circuit chips incorporated within each memory bank.

FIG. 2 is a block diagram that illustrates the internal configuration of ROM banks 106 and 107. As is illustrated in FIG. 2, ROM bank 106 includes four ROM chips 200–203 and ROM bank 107 includes ROM chips 204–207. Each ROM chip 200–207 is capable of storing 500 kilobytes of 8-bit data. The chip enable input lines of ROM chips 200–203 are coupled to the ROM bank enable input line 120 and the chip enable input lines of ROM chips 204–207 are connected to ROM bank enable input line 121. ROM banks 108 and 109 are configured similarly.

Referring back to FIG. 1, computer system 100 is implemented such that one of the ROM banks 106–109 includes boot code that is accessed by microprocessor 102 upon power-up of the computer system 100. In the embodiment of FIG. 1, ROM bank 109 includes this boot code.

FIG. 3 is a table that illustrates the ROM chip enable encoding implemented by chip enable address encoder 114 to access each of the ROM banks 106–109. It is noted that the ROM chip enable encoding is implemented such that one of the chip enable signals CE0–CE3 may be asserted low to enable a respective ROM bank 106–109. For example, to enable ROM bank 106, the chip enable signal CE0 is asserted low by the chip enable address encoder 114. Similarly, the chip enable signal CE1 is asserted low to enable ROM bank 107, and so on.

Accordingly, referring back to FIG. 1, upon power-up of computer system 100, microprocessor 102 accesses the boot code stored within ROM bank 109 by executing a memory read cycle and driving the address lines LA[31:0] with a prespecified address value (i.e., the starting address of the boot code). In one embodiment, the boot code is stored at a starting address of FFFFFFF0(HEX). In response to this address signal, chip enable address encoder 114 asserts the chip enable signal CE3 low which thereby enables ROM bank 109 and allows the first byte of boot code to be read and executed. Subsequent bytes of the boot code may be similarly read during subsequent cycles. It is noted that when the boot code is being read, the other chip enable output lines (i.e., CE0–CE2) of chip enable address encoder 114 are deasserted high.

Among the boot code accessed from ROM array 105 may be configuration information indicative of the number of ROM banks connected to computer system 100. The configuration information may be provided since, upon power-up, the memory controller 104 is incognizant of the number of banks connected thereto. If present, microprocessor 102 causes this configuration information to be stored within configuration register 116 during the booting procedure. As will be better understood below, the chip enable address encoder 114 subsequently drives the chip enable signals CE0–CE3 according to this configuration information. It is noted that the configuration register 116 may initially contain a value indicative of a default number of ROM banks. In the preferred embodiment, configuration register 116 initially contains a default value indicative of four ROM banks. Specifically, in the preferred embodiment, a bit of configuration register 116 is set low at power-up to indicate that four ROM banks are connected to the system. Unless the boot code causes this default value to change, the chip enable address encoder will assume that four ROM banks are connected to the system.

Thus, for the configuration of FIG. 1, when the boot code is accessed from ROM bank 109, the value within configuration register 116 is not changed since, in fact, four banks of ROM are connected to the computer system 100. Following completion of the booting subroutines, microprocessor 102 may access selected memory locations within ROM banks 106–109 by driving the address bus according to the specific memory mapping as chosen by the system designer. In one embodiment, ROM bank 106 is mapped within the system to store address values in the range of FF7FFFF0 to FF9FFFEF (HEX); ROM bank 107 is mapped to store address values in the range of FF9FFF0 to FFBFFFEF; ROM bank 108 is mapped to store address values in the range of FFBFFFF0 to FFDFFFEF; and ROM bank 109 is mapped to store address values in the range of FF0FFFF0 to FFFFFFFF. Therefore, depending upon the upper 13-bits of the addressing signal (LA[31:19]), the chip enable address encoder 114 either keeps all of the chip enable signals CE0–CE3 deasserted high (if the address does not fall within a range mapped by one of the ROM banks 106–109), or drives one of the signals CE0–CE3 to enable the corresponding ROM bank 106–109. It is noted that during this mode of operation, as determined by the internal bit of configuration register 116, the chip enable address encoder 114 drives the chip enable signals CE0–CE3 in a mutually exclusive manner such that only one chip enable signal can be asserted at a time. It is further noted that the particular values of the upper 13-bits of the addressing signal (LA[31:19]) that cause a chip enable signal CE0–CE3 to be asserted low is dependent upon the particular memory mapping scheme employed, and that such may vary from system to system.

Figure 4:
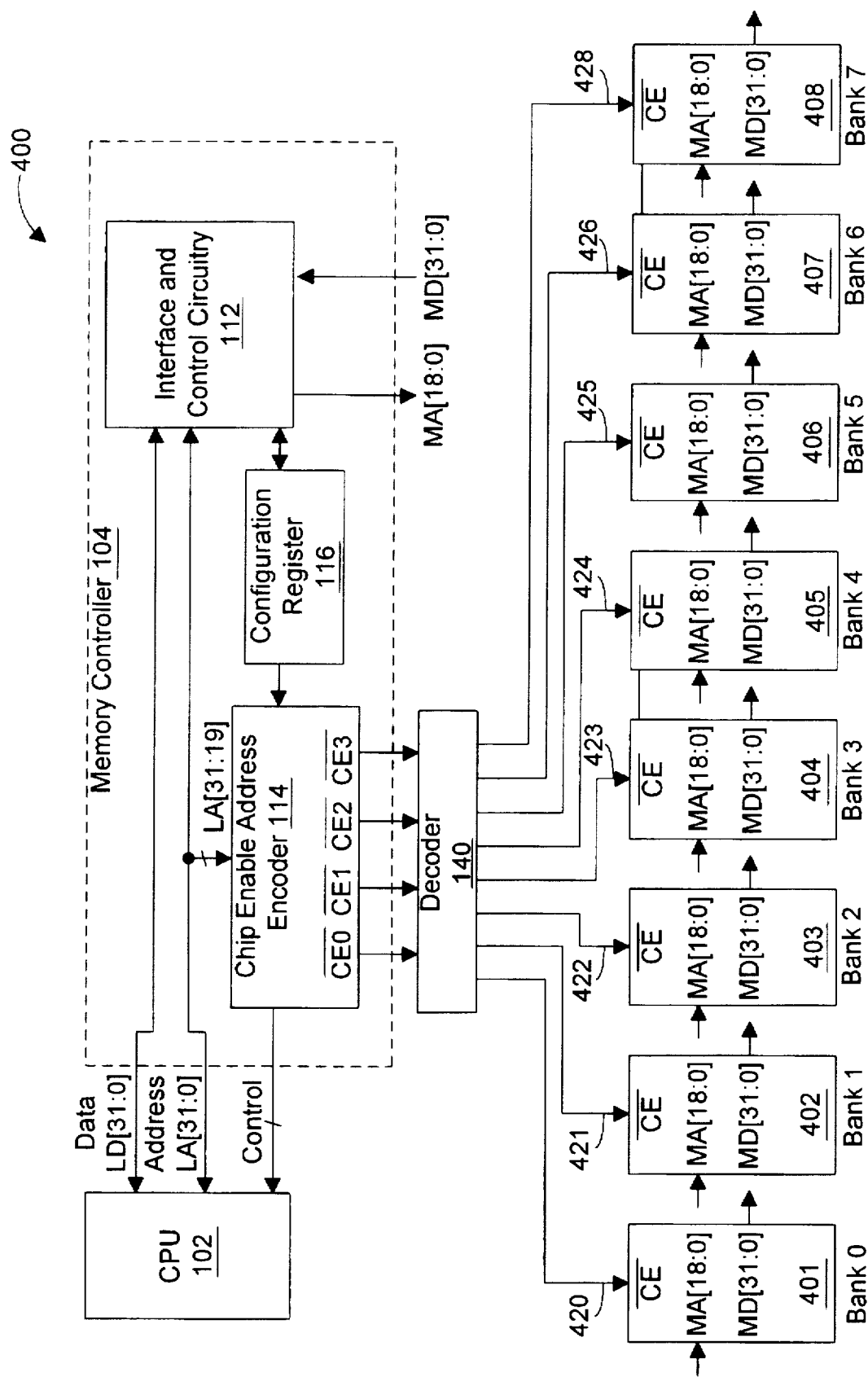
FIG. 4 is a block diagram of a computer system including a memory controller connected to eight banks of read only memory according to the present invention.

Referring next to FIG. 4, a block diagram of a similar computer system 400 is shown that includes eight ROM banks 401–408 rather than four. The computer system 400 further includes a decoder 410 coupled between the memory controller 104 and the ROM banks 401–408. It is noted that the microprocessor 102 and memory controller 104 of FIG. 4 are identical to those illustrated in FIG. 1. It is similarly noted that each ROM bank 401–408 is identical to the corresponding ROM banks of FIG. 1.

In this embodiment, ROM bank 408 contains the boot code for computer system 400. Accordingly, upon power-up of computer system 400, microprocessor 102 again accesses the boot code by executing a read cycle and driving the address lines LA[31:0] with the prespecified boot code memory location. It is noted that this prespecified memory location for the boot code is identical to that specified above with respect to the configuration of FIG. 1. It is also noted that during the initial power-up of computer system 400, memory controller 104 is incognizant of the number of ROM banks connected thereto. In response to the boot code address driven on address lines LA[31:0], chip enable address encoder 114 drives the chip enable signal CE0 low as it did for the configuration of FIG. 1. In this configuration, however, decoder 410 receives the asserted chip enable signal CE0 and consequently drives the ROM bank enable input line 427 of ROM bank 408 low. It is noted that at this point, the chip enable signals CE1, CE2, and CE3 are still deasserted high. The microprocessor 102 is thereby provided the first byte of boot code through interface and control circuit 112, and similar cycles may be executed by microprocessor 102 to access successive memory locations that contain the remainder of the boot code.

One of the operations induced by the boot code results in a value indicative of the number of ROM banks (i.e., eight) coupled to the computer system 400 to be stored within configuration register 116. In the preferred embodiment, an internal bit of configuration register 116 is set high to indicate the connection of eight ROM banks. During subsequent operations of computer system 400, and in response to the setting of this internal bit, the chip enable address encoder 114 encodes the chip enable output signals CE0–CE3 according to the table of FIG. 5. During this mode of operation, chip enable address encoder 114 is programmed by configuration register 116 to assert one or more of the chip enable signals CE0–CE3 at a time to enable a selected ROM bank 401–408. For example, as illustrated in FIG. 5, if the upper 13-bits of the addressing signal LA[31:19] comprise an address value mapped within ROM bank 6 (i.e., ROM bank 407), the chip enable address encoder drives the chip enable signals CE0 and CE3 low while keeping the chip enable signals CE1 and CE2 high. Similarly, if the addressing signals LA[31:19] comprise a value mapped to ROM bank 3 (i.e., ROM bank 404), the chip enable signals CE0 and CE1 are driven low while the chip enable signals CE2 and CE3 are held high.

As a result of the memory controller 104 and the computer systems 100 and 400 of FIGS. 1 and 4, a common ROM array may be utilized to store both boot code as well as other software such as user software and the operating system. The memory controller includes a programmable chip enable address encoder that, prior to system configuration, drives the chip enable output lines of the memory controller in a mutually exclusive relationship such that only chip enable signal is asserted to access the boot code. Subsequently, the encoding of the chip enable signals is dependent upon a configuration bit indicative of the number of ROM banks connected thereto. The computer systems and memory controller provide flexibility in the system design (i.e., by allowing a variable number of ROM banks to be connected thereto) while minimizing the number of chip enable output lines incorporated on the integrated circuit. By minimizing the number of chip enable output lines provided on the integrated circuit, the overall pin count of the integrated circuit is decreased, thereby decreasing overall cost.

It is noted that the non-volatile memory chip enable encoding method described above may be implemented in conjunction with a memory controller as taught within the copending, commonly assigned patent application entitled "Non-Volatile Memory Array Controller Capable of Controlling Memory Banks Having Variable Bit Widths", by MacDonald et al., filed concurrently herewith, Ser. No. 08/166,124. This patent application is incorporated herein by reference in its entirety.

Numerous variations and modifications will become apparent to those skilled in the art once the above disclosure is fully appreciated. For example, ROM banks having memory capacities that differ from those of FIGS. 1 and 4 may be employed, and different specific encoding values (other than those of FIG. 5) may be used for mapping and enabling the various ROM banks. In addition, although the embodiments illustrated above include either four or eight ROM banks, a greater or lesser number of ROM banks may similarly be connected. Furthermore, other types of non-volatile memory such as flash memory devices may be substituted in the place of one or more of the ROM banks 106–109 and 401–408. It is intended that the following claims be interpreted to embrace all such variations and modifications.

What is claimed is:

1. A non-volatile memory chip enable encoding method for enabling selected memory banks within a non-volatile memory array, wherein said non-volatile memory array is operatively coupled to a memory controller including a plurality of chip enable output lines, said chip enable encoding method comprising the steps of:
   providing a plurality of memory banks each having a separate bank enable input line;
   storing boot code within one of said memory banks;
   asserting a chip enable signal at only one of said chip enable output lines to thereby enable said one of said memory banks and retrieve said boot code; and
   depending upon the number of memory banks coupled to said memory controller, wherein said number of memory banks is indicated by configuration information included in said boot code, either:
      driving said plurality of chip enable output lines from said memory controller in a mutually exclusive relationship such that a chip enable signal is asserted at only one chip enable output line at a time to thereby enable any other memory bank within said non-volatile memory array, wherein a separate chip enable output is dedicated for enabling a single bank, in configurations wherein said number of memory banks is less than or equal to a total number of chip enable output lines of said memory controller; or
      driving said plurality of chip enable output lines from said memory controller such that more than one chip enable signal is asserted at a time to thereby provide encoded information regarding a memory bank within said non-volatile memory array to be enabled, in configurations wherein said number of memory banks is greater than a total number of chip enable output lines of said memory controller.

2. The non-volatile memory chip enable encoding method as recited in claim 1 comprising the further step of storing within a configuration register at least one bit of data indicative of the number of memory banks coupled to said memory controller.

3. The non-volatile memory chip enable encoding method as recited in claim 2 wherein said at least one bit of data is derived from said boot code.

4. The non-volatile memory chip enable encoding method as recited in claim 1 comprising the further step of providing said encoded information to an input line of an external decoder.

5. The non-volatile memory chip enable encoding method as recited in claim 4 comprising the further step of providing a bank enable output signal from an output line of said decoder to a selected memory bank of said non-volatile memory array.

6. A computer system comprising:
   a memory controller including a plurality of chip enable output lines;
   a non-volatile memory array including a plurality of memory banks, wherein one of said memory banks includes boot code that is configured to be transferred to said microprocessor during system boot, and wherein each of said memory banks includes a bank enable input line; and
   a decoder having a plurality of input lines coupled to said plurality of chip enable output lines of said memory controller and having a plurality of output lines each coupled to a separate bank enable input line of said memory banks;
   wherein said memory controller includes a chip enable encoder configured to assert a chip enable signal at a predetermined one of said plurality of chip enable output lines during system boot to enable said one of said memory banks, and wherein after system boot said chip enable address encoder is configured to simultaneously assert chip enable signals at more than one of said chip enable output lines to enable another memory bank within said non-volatile memory array.

7. The computer system as recited in claim 6 further comprising a microprocessor coupled to said memory controller.

8. The computer system as recited in claim 6 wherein said decoder is configured to receive said chip enable signals asserted at more than one of said chip enable output lines and is configured to responsively assert a signal at an output line of said decoder to thereby enable said another memory bank within said non-volatile memory array.

9. The computer system as recited in claim 6 wherein said memory controller further includes a configuration register coupled to said chip enable address encoder.

10. The computer system as recited in claim 9 wherein said configuration register is configured to store a value indicative of the number of memory banks connected to said computer system.

11. The computer system as recited in claim 10 wherein said chip enable address encoder is configured to drive said chip enable output lines depending upon said value stored within said configuration register.

12. The computer system as recited in claim 6 wherein said memory controller further includes an interface and control circuit configured to orchestrate the transfer of data and address signals between said microprocessor and said non-volatile memory array.

13. The computer system as recited in claim 10 wherein said chip enable address encoder is programmable such that said chip enable address encoder is configured to drive said chip enable output lines in a mutually exclusive relationship when said configuration register indicates that a first number of memory banks are connected to said computer system, and wherein said chip enable address encoder is configured to drive said chip enable output lines such that more than one chip enable signal is asserted at a time when said configuration register indicates that a second number of memory banks are connected to said computer system.

14. The computer system as recited in claim 7 wherein said microprocessor and said memory controller are fabricated on a common integrated circuit chip.

15. A memory controller comprising:

an interface and control circuit configured to orchestrate the transfer of data and address signals between a microprocessor and a non-volatile memory array;

a configuration register coupled to said interface and control circuit configured to store a value indicative of the number of memory banks provided within said non-volatile memory array; and a chip enable address encoder coupled to said configuration register wherein said chip enable address encoder includes a plurality of chip enable output lines, and wherein said chip enable address encoder is programmable such that, if said configuration register indicates that a first number of memory banks are provided within said non-volatile memory array, the chip enable output lines are driven such that only one chip enable signal is asserted at a given time at said chip enable output lines, and, if said configuration register indicates that a second number of banks are provided within said non-volatile memory array, the chip enable output lines are driven such that more than one chip enable signal is asserted at said chip enable output lines at a time; and wherein said value indicative of the number of memory banks is stored in said configuration register responsive to an execution of boot code stored within one of said memory banks.

16. The memory controller as recited in claim 15 wherein said configuration register contains a default value upon power-up of said memory controller.

17. The memory controller as recited in claim 16 wherein said chip enable address encoder is configured to assert a chip enable signal at only one chip enable output line at a time when said default value is stored within said configuration register.

* * * * *